United States Patent [19]

Sawada

[11] Patent Number: 5,689,423
[45] Date of Patent: Nov. 18, 1997

[54] VEHICLE NAVIGATION SYSTEM FOR EVALUATING A RETURN ROUTE BASED ON COST

[75] Inventor: Yasuhiro Sawada, Wako, Japan

[73] Assignee: Honda Giken Kogyo Kabushiki Kaisha, Tokyo, Japan

[21] Appl. No.: 400,376

[22] Filed: Mar. 8, 1995

[30] Foreign Application Priority Data

Mar. 9, 1994 [JP] Japan ................... 6-076274

[51] Int. Cl.$^6$ ................................ G06F 165/00
[52] U.S. Cl. ................ 364/444.2; 364/449.3; 340/995; 73/178 R
[58] Field of Search ............... 364/443, 444, 364/449; 340/988, 990, 995; 73/178 R

[56] References Cited

U.S. PATENT DOCUMENTS

| | | | |
|---|---|---|---|
| 4,814,989 | 3/1989 | Dobereiner et al. | 364/444 |
| 4,888,699 | 12/1989 | Knoll et al. | 364/449 |
| 5,187,667 | 2/1993 | Short | 73/178 R |
| 5,291,413 | 3/1994 | Tamai et al. | 364/449 |
| 5,291,414 | 3/1994 | Tamai et al. | 364/449 |
| 5,369,588 | 11/1994 | Hayami et al. | 364/449 |
| 5,383,127 | 1/1995 | Shibata | 364/443 |
| 5,450,343 | 9/1995 | Yurimoto | 364/449 |
| 5,459,667 | 10/1995 | Odagaki et al. | 364/444 |
| 5,508,931 | 4/1996 | Snider | 364/449.1 |
| 5,521,826 | 5/1996 | Matsumoto | 364/449.2 |
| 5,523,765 | 6/1996 | Ichikawa | 364/449 |
| 5,550,538 | 8/1996 | Fujii et al. | 340/995 |
| 5,559,511 | 9/1996 | Ito et al. | 340/995 |
| 5,608,635 | 3/1997 | Tamai | 364/449.3 |

FOREIGN PATENT DOCUMENTS

| | | |
|---|---|---|
| 583773A3 | of 1994 | European Pat. Off. |
| 5870117 | of 1983 | Japan |
| 1138409 | of 1989 | Japan |

OTHER PUBLICATIONS

European Search Report.

*Primary Examiner*—Kevin J. Teska
*Assistant Examiner*—Tyrone V. Walker
*Attorney, Agent, or Firm*—Lyon & Lyon LLP

[57] ABSTRACT

A vehicle navigation system. A road map is displayed on a screen. The present position of the vehicle is displayed on the road map displayed on the screen. A guide route connecting a start point of the vehicle and a destination of the vehicle which are set in advance is determined, and indicated on the road map. A return route for returning the vehicle to the guide route is selected in response to a deviation of the vehicle from the guide route. A cost required for the vehicle to return to the guide route via the return route is calculated, and the vehicle is prevented from entering the return route depending on the cost calculated.

11 Claims, 4 Drawing Sheets

VEHICLE NAVIGATION SYSTEM FOR EVALUATING A RETURN ROUTE BASED ON COST

BACKGROUND OF THE INVENTION

1. Field of the Invention

This invention relates to vehicle navigation systems capable of constantly indicating the present position of a vehicle on a road map displayed on a screen as the vehicle travels, thereby aiding to guide the vehicle along a predetermined route set on the road map.

2. Prior Art

A vehicle navigation system of this type is described in Japanese Laid-Open Patent Publication (Kokai) No. 58-70117. In the disclosed system a start point, a destination, and crossings which the vehicle is to pass on the way from the start point to the destination are previously designated as a guide route on a road map displayed on a screen by inputting data representative thereof. Then, the present position of the vehicle on the road map is displayed to assist in directing the vehicle along the guide route.

Further, an improved vehicle navigation system is disclosed in Japanese Laid-Open Patent Publication (Kokai) No. 1-138409, wherein a guide route is automatically set to the optimum one (i.e., one which is most advantageous in distance and travel cost, such as a toll, of possible routes connecting between the start point and the destination).

In these vehicle navigation systems, when a vehicle deviates from a guide route during travel, the deviation may be corrected by returning to the guide route originally set, or setting a new guide route to the destination, thereby continuing the travel (hereinafter, the route for returning to the original guide route or the newly set guide route will be referred to as the "return route"). Anyway, the return route may be disadvantageous due to increased costs ascribable to increases in the distance, time, and/or expense of travel.

A possible solution to this inconvenience is to notify the driver of a course to be taken whenever the vehicle comes near a point, such as a crossing, at which the vehicle can deviate from the guide route. However, this can be an annoyance to the driver when a large number of crossings and the like are frequently identified.

Accordingly, it would be advantageous to provide a vehicle navigation system capable of generating a warning or preventing a course deviation when a cost of travel incurred as a result of the deviation exceeds a designated threshold.

SUMMARY OF THE INVENTION

It is an object of the invention to provide a vehicle navigation system which is capable of cautioning the driver of a vehicle with regard to a possible deviation in a course of travel from a predetermined guide route only when the deviation from the guide route results in a large increase in travel costs (i.e., distance, time, or expense of travel).

To attain the above object, according to a first aspect of the invention, there is provided a vehicle navigation system comprising:

map displaying means for displaying a road map on a screen;

present position-indicating means for indicating a present position of the vehicle on the road map on the screen;

guide route-determining/indicating means for determining a guide route connecting a start point of the vehicle and a destination of the vehicle which are set in advance, and indicating the guide route on the road map;

return route-selecting means for selecting a return route for returning the vehicle to the guide route in response to a deviation of the vehicle from the guide route;

cost-calculating means for calculating a cost required for the vehicle to return to the guide route via the return route; and prevention means for preventing the vehicle from entering the return route, depending on the cost calculated by the cost-calculating means.

Preferably, the prevention means comprises warning means for issuing a warning for preventing the vehicle from entering the return route.

Preferably, the prevention means comprises determining means for determining whether or not the cost exceeds a predetermined value, and warning means for issuing a warning for preventing the vehicle from entering the return route when the cost exceeds the predetermined value.

Preferably, the cost includes a time period and a toll which are required for the vehicle to return to the guide route via the return route.

According to a second aspect of the invention, there is provided a vehicle navigation system comprising:

map displaying means for displaying a road map on a screen;

present position-indicating means for indicating a present position of the vehicle on the road map on the screen;

guide route-determining/indicating means for determining a guide route connecting a start point of the vehicle and a destination of the vehicle which are set in advance, and indicating the guide route on the road map;

return route-selecting means for selecting a return route for returning the vehicle to the guide route in response to a deviation of the vehicle from the guide route;

cost-calculating means for calculating a cost required for the vehicle to return to the guide route via the return route; and warning means for issuing a warning for preventing the vehicle from entering the return route, depending on the cost calculated by the cost-calculating means.

Preferably, the prevention means comprises determining means for determining whether or not the cost exceeds a predetermined value, and warning means for issuing a warning for preventing the vehicle from entering the return route when the cost exceeds the predetermined value.

According to a third aspect of the invention, there is provided a vehicle navigation system comprising:

map displaying means for displaying a road map on a screen;

present position-indicating means for indicating a present position of the vehicle on the road map on the screen;

guide route-determining/indicating means for determining a guide route connecting a start point of the vehicle and a destination of the vehicle which are set in advance, and indicating the guide route on the road map;

return route-selecting means for selecting a return route for returning the vehicle to the guide route in response to a deviation of the vehicle from the guide route;

cost-calculating means for calculating a cost required for the vehicle to return to the guide route via the return route;

determining means for determining whether or not the cost exceeds a predetermined value; and warning means for issuing a warning for preventing the vehicle from entering the return route when the cost exceeds the predetermined value.

According to a fourth aspect of the invention, there is provided a vehicle navigation system comprising:

map displaying means for displaying a road map on a screen;

present position-indicating means for indicating a present position of the vehicle on the road map on the screen;

guide route-determining/indicating means for determining a guide route connecting a start point of the vehicle and a destination of the vehicle which are set in advance, and indicating the guide route on the road map; and return route-determining means for determining a return route for returning the vehicle to the guide route in response to a deviation of the vehicle from the guide route, the return route-determining means determining the return route according to a cost required for the vehicle to return to the guide route via the return route.

The above and other objects, features, and advantages of the invention will become more apparent from the following detailed description taken in conjunction with the accompanying drawings.

DETAILED DESCRIPTION

The invention will be described in detail with reference to drawings showing an embodiment thereof.

Figure 1:
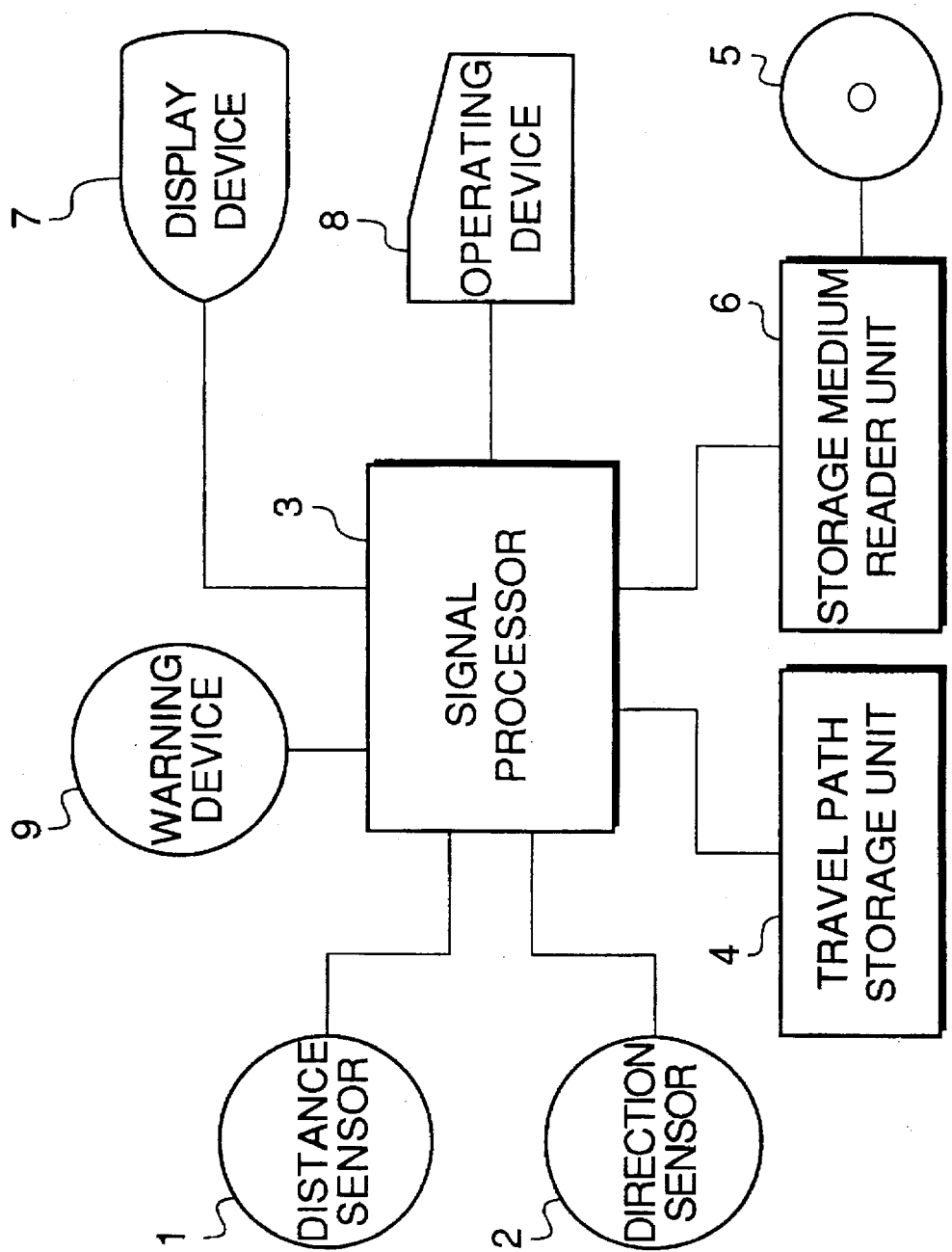
FIG. 1 is a block diagram showing the basic arrangement of a vehicle navigation system according to one embodiment of the invention.

Referring first to FIG. 1, there is shown the basic arrangement of a vehicle navigation system according to one embodiment of the invention. The vehicle navigation system comprises a distance sensor 1, a direction sensor 2, a signal processor 3, a travel path storage unit 4, a map information-storing medium 5, a storage medium reader unit 6, a display device 7, an operating device 8 and a warning device 9. The distance sensor 1 provides a signal pulse whenever the vehicle travels a selected unit distance, based on a rotation of the wheels of the vehicle. The direction sensor 2 provides a signal indicative of a change in the angular velocity in a yawing direction of the vehicle, and delivers a signal proportional to an amount of change in the traveling direction to the signal processor 3. The signal processor 3 comprises a microcomputer for measuring the travel distance covered by the vehicle (i.e., by counting the number of signal pulses received from the distance sensor 1), and for determining a change in the traveling direction based on the signal output from the direction sensor 2. The signal processor 3 determines, by computation, the present position of the vehicle in an X-Y coordinate system whenever the vehicle travels a predetermined distance, and performs the overall control of the vehicle navigation system. The travel path storage unit 4 sequentially stores data indicative of the present position of the vehicle determined on each occasion by the signal processor 3 as a finite sequence of positional information. The map information-storing medium 5 stores road map information comprising digital map data. The storage medium reader unit 6 selectively reads road map information representing an area in which the vehicle is traveling from the map information-storing medium 5. The display device 7 displays a predetermined road map on a screen based on the road map information read by the storage medium reader unit 6 and indicates the present position of the vehicle on the road map displayed together with the advancing direction as the vehicle travels. An operating device 8 gives directions to the signal processor 3. These directions including, for example, selection and display of a map on the screen, setting of a start point and a destination of the vehicle on the map displayed and automatic setting of the optimum guide route therebetween, selective designation of the covered route display, change of settings of display modes, such as selection of a display scale, and other directions, and a warning device 9 for producing a guide message, e.g. by alarm in the form of synthesized voice.

According to this arrangement, a road map is selectively read and displayed on the display device 7, and the present position of the vehicle on the X-Y coordinates is repeatedly and continuously calculated based on the scale of the map set in advance by the signal processor 3 as the vehicle travels from a start point S set on the displayed map. Results of the calculation are sequentially delivered to the travel path storage unit 4 to update the data stored therein, and the data are then read out from the travel path storage unit and delivered to the display device 7.

Figure 2:
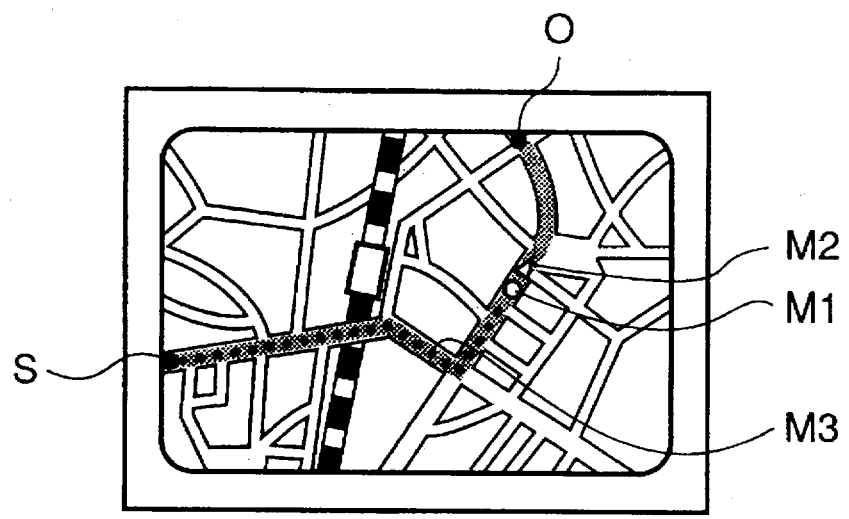
FIG. 2 is a diagram showing an example of a display screen for a vehicle navigation system.

The display device 7 displays thereon an image indicative of the state of travel of the vehicle, e.g. as shown in FIG. 2, a mark M1 indicating the present position of the vehicle on the displayed map, a mark M2 indicating the advancing direction of the vehicle in the present position, and covered route-indicating marks M3 indicating a route covered from the start point S to the present position indicated by the mark M1, as the vehicle advances.

The signal processor 3, based on map data read from the map information-storing medium 5, searches for an optimum guide route which is advantageous with respect to travel costs incurred when the vehicle travels from the start point S to the destination O both set on the map. The optimum guide route thus determined is indicated e.g. in a special color, thereby performing navigation for the driver of the vehicle such that the present position of the vehicle cana be displayed on the guide route once the vehicle departs from the start point S.

It should be noted that in the present embodiment, a conventional method of searching for the optimum guide route is used to determine a minimum in travel cost when the vehicle travels from the start point to the destination O.

According to the present invention, in the vehicle navigation system, and more particularly in the signal processor 3, there are provided means for selecting a return route when the vehicle deviates from the guide route, means for calculating a travel cost to be incurred in following the selected return route and determining whether or not the travel cost calculated exceeds a threshold value, and means for generating a caution or warning or a guide message to prevent the vehicle from deviating into the return route during travel when the travel cost of the return route exceeds the threshold value.

More specifically, first the start point S and the destination O are set on the map, and then, based on this setting, the optimum guide route is searched for. Data on the optimum guide route are stored in a guide route-storing block of an internal memory within the signal processor 3. Then, a deviating route selection range is determined along the guide route, and within this range, possible deviating courses into which the vehicle can deviate are selected.

In performing this selection, routes having higher possibility of deviation are selected preferentially according to a predetermined determination algorithm, which takes into consideration road circumstances, e.g. closeness of a crossing at which the vehicle should turn to the right to another crossing, etc. The routes thus selected are stored together by order of priority depending upon the possibility of deviation in a deviating course-storing area of the internal memory within the signal processor 3.

Then, a return route to be taken when the vehicle deviates into one of the selected deviating courses is searched for, and the travel cost of the return route is calculated. Then, it is determined whether or not the travel cost thus calculated exceeds the threshold value, e.g. by the following procedure:

Now, let it be assumed that the routes are expressed as follows:

Po: guide route

P: return route

Po∩P: common part of the guide route and the return route

Po—Po∩P: part of the guide route which is not common with the return route

P—Po∩P: part of the return route which is not common with the guide route.

The travel cost C(P) of the return route P is determined from an average time period required for the vehicle to travel along the return route P, and a toll, if any, as follows:

Cd(P): estimated average time period required for the vehicle to travel along the return route (the sum of distances of route sections x respective estimated average speeds along the route sections)

Ct(P): total of tolls to be paid for the return route.

Conditions for determining whether or not the travel cost of the return route is reasonable are defined as follows:

$$\Delta Cd(P) = Cd(P-Po \cap P) - (Po - Po \cap P) > 15 \text{ minutes}$$

$$\Delta Ct(P) = Ct(P-Po \cap P) - Ct(Po-Po \cap P) >$$

$$0.1 Ct(Po-Po \cap P).$$

Figure 3:
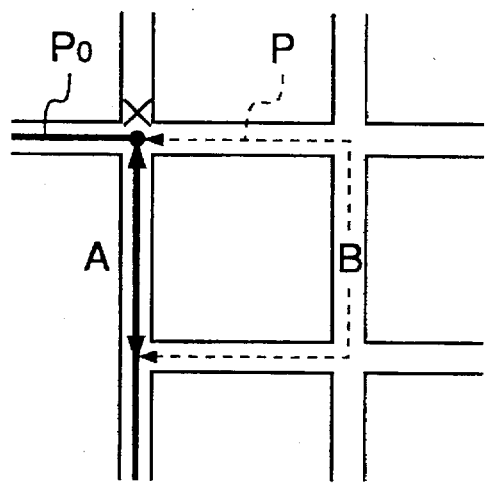
FIG. 3 is a diagram showing an example of a return route to be taken when a vehicle deviates from a guide route.

When the travel cost of a return route determined to be taken for a deviating course into which the vehicle can deviate from the guide route fulfills the above conditions, it is determined that the travel cost of the return route is high. More specifically, referring to FIG. 3 and assuming that the vehicle deviates from a guide route Po at a point X and then returns to the guide route Po via a return route P, it may be determined that the travel cost of the return route is high, if an average time period required for the vehicle to travel through a section B over which the vehicle deviates from the guide route minus an average time period required for the vehicle to travel through a regular section A of the guide route is above 15 minutes, or if the total of tolls becomes higher by 10% or more when the vehicle travels through the section B than when the vehicle travels through the section A.

If it is determined that the travel cost of the return route P is high, an alarm or a guide message in the form of synthesized voice is delivered from the warning device 9, before the present position of the vehicle reaches the point X at which there is a high possibility of deviation of the vehicle from the guide route.

Figure 4:
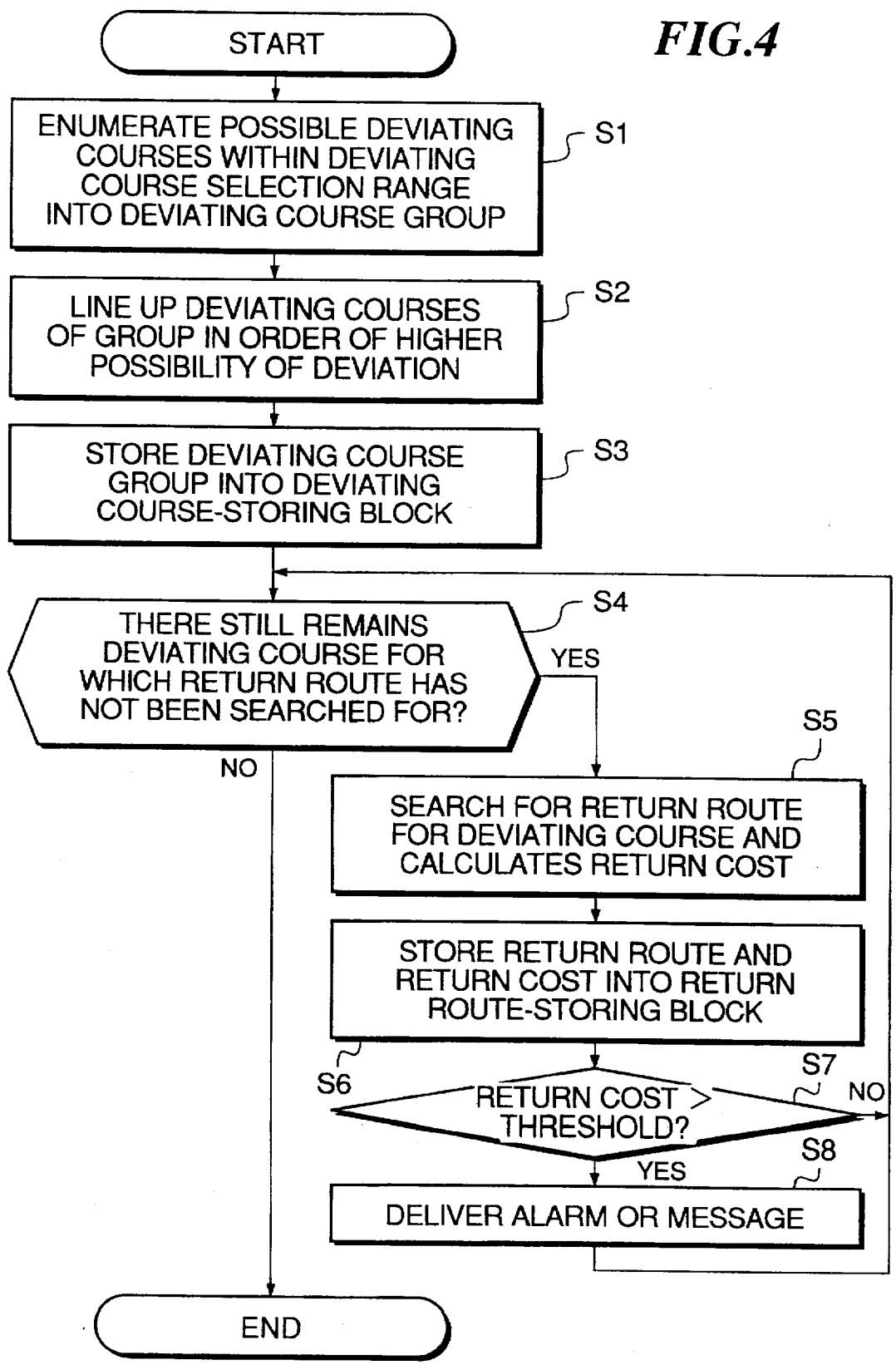
FIG. 4 is a flowchart illustrating a series of processing steps for searching for a return route and determining the travel cost of the return route.

FIG. 4 shows a program for selecting deviating courses, searching for a return route, and determining whether or not the travel cost of the return route is high.

First, at a step S1, a deviating course selection range is determined according to a guide route previously set, and possible deviating courses into which the vehicle can deviate within the determined deviating course selection range are enumerated into a deviating course group.

At the following step S2, the possible deviating courses of the deviating course group are lined up by order of the highest possibility of deviation.

At the following step S3, the deviating course group is stored into the memory block.

Then, it is determined at a step S4 whether or not there still remains a deviating course for which a return route has not been searched for. If the answer to this question is negative (NO), the program is immediately terminated, whereas if the answer is affirmative (YES), the program proceeds to a step S5.

At the step S5, a return route which has not been searched for the deviating course is searched for, and the travel cost of the return route (return cost) searched out is calculated.

At the following step S6, the return route and the return cost are stored into the return route-storing block. Then, the program proceeds to a step S7.

At the step S7, it is determined whether or not the return cost is above a threshold value. If the answer to this question is negative (NO), the program returns to the step S4, whereas if the answer is affirmative (YES), the program proceeds to a step S8.

At the step S8, an alarm or a guide message is issued by the warning device 9 before the vehicle reaches a point at which the vehicle can deviate into the deviating course of which the return cost is determined to be high at the step S7.

Further, during travel of the vehicle, if the present position of the vehicle actually deviates from the guide route, the signal processor 3 prepares an updated guide route according to a return route searched according to the deviation course, whereby the data stored in the guide route-storing block is updated. Then, according to the updated guide route, the processing described above is continued.

Figure 5:
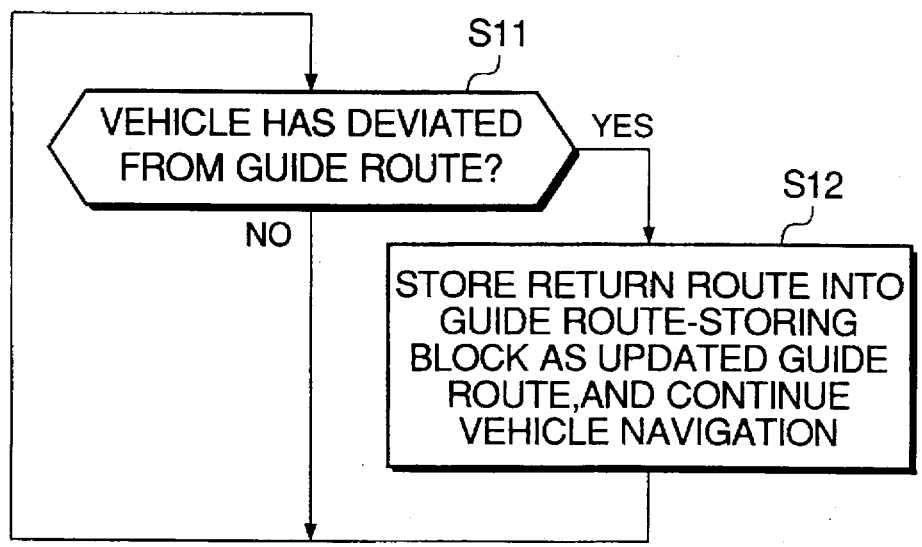
FIG. 5 is a flowchart illustrating a series of processing steps carried out when the present position of the vehicle has deviated from the guide route.

FIG. 5 shows a program for this processing.

First, at a step S11, it is determined whether or not the present position of the vehicle has deviated from the guide route. If the answer to this question is negative (NO), the program returns to the step S11, whereas if the answer is affirmative (YES), a return route is identified according to the deviating course, and the identified return route is stored in the guide route-storing block as an updated guide route to thereby continue vehicle navigation at a step S12.

Figure 6:
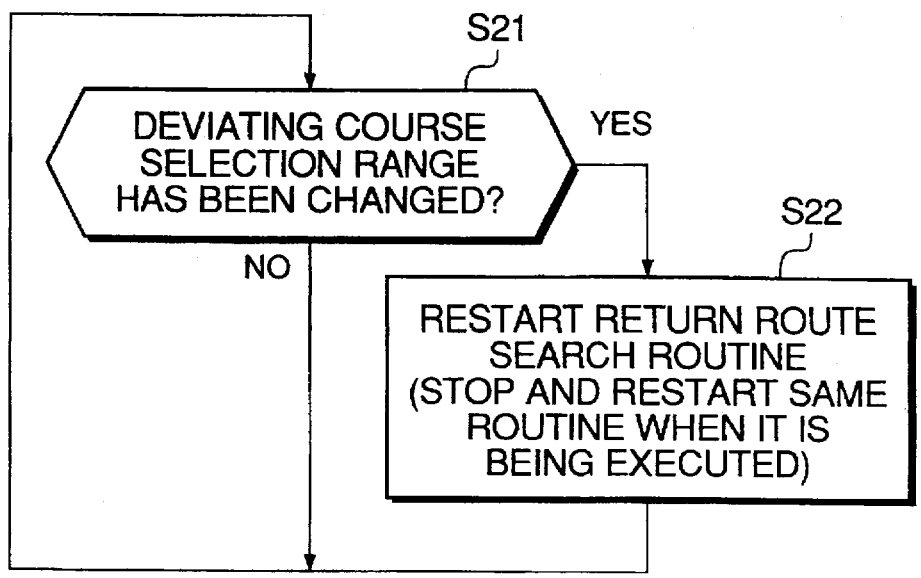
FIG. 6 is a flowchart of processing steps carried out when a deviating course selection range has changed.

After the guide route has been updated due to deviation of the vehicle, the deviating course selection range is updated accordingly. Within the updated range, courses having a possibility of deviation are selected, and the data stored in the deviating course-storing block in the internal memory of the signal processor 3 is updated. Then, based on the selected courses having a possibility of deviation, the processing described hereinabove is carried out. FIG. 6 shows a program for the updating processing.

First, at step S21, it is determined whether or not the deviating course selection range has been changed. If the answer to this question is negative (NO), the program returns to the step S21, whereas if the answer is affirmative (YES), the program proceeds to a step S22, where the FIG. 4 return route search routine is started again (the routine is stopped and started again if it is already being executed).

What is claimed is:

1. A vehicle navigation system, comprising:

map displaying means for displaying a road map on a screen;

present position-indicating means for indicating a present position of said vehicle on said road map on said screen;

guide route-determining/indicating means for determining a guide route connecting a start point of said vehicle and a destination of said vehicle which are set in advance, and indicating said guide route on said road map;

return route-selecting means for previously selecting a return route for returning said vehicle to said guide route in response to a possible deviation of said vehicle from said guide route before a deviation occurs;

cost-calculating means for calculating cost required for said vehicle to return to said guide route via said return route; and prevention means for preventing said vehicle from entering said return route, depending on said cost calculated by said cost-calculating means.

2. The vehicle navigation system of claim 1, wherein said prevention means comprises warning means for issuing a warning for preventing said vehicle from entering said return route.

3. The vehicle navigation system of claim 1, wherein said preventing means comprises determining means for determining whether or not said cost exceeds a predetermined value, and warning means for issuing a warning for preventing said vehicle from entering said return route when said cost exceeds said predetermined value.

4. The vehicle navigation system of claim 1, wherein said cost includes a time period and a toll which are required for said vehicle to return to said guide route via said return route.

5. A vehicle navigation system, comprising:

map displaying means for displaying a road map on a screen;

present position-indicating means for indicating a present position of said vehicle on said road map on said screen;

guide route determining/indicating means for determining a guide route connecting a start point of said vehicle and a destination of said vehicle which are set in advance, and indicating said guide route on said road map;

return route-selecting means for previously selecting a return route for returning said vehicle to said guide route in response to a possible deviation of said vehicle from said guide route before a deviation occurs;

cost-calculating means for calculating cost required for said vehicle to return to said guide route via said return route; and warning means for issuing a warning for prevention of said vehicle from entering said return route, depending on said cost calculated by said cost-calculating means.

6. The vehicle navigation system of claim 5, wherein said prevention means comprises determining means for determining whether or not said cost exceeds a predetermined value, and warning means for issuing a warning for preventing said vehicle from entering said return route when said cost exceeds said predetermined value.

7. A vehicle navigation system, comprising:

map displaying means for displaying a road map on a screen;

present position-indicating means for indicating a present position of said vehicle on said road map on said screen;

guide route-determining/indicating means for determining a guide route connecting a start point of said vehicle and a destination of said vehicle which are set in advance, and indicating said guide route on said road map;

return route-selecting means for previously selecting a return route for returning said vehicle to said guide route in response to a possible deviation of said vehicle from said guide route before a deviation occurs;

cost-calculating means for calculating cost required for said vehicle to return to said guide route via said return route;

determining means for determining whether or not said cost exceeds a predetermined value; and warning means for issuing a warning for preventing of said vehicle from entering said return route when said cost exceeds said predetermined value.

8. A vehicle navigation system, comprising:

map displaying means for displaying road map on a screen;

present position-indicating means for indicating a present position of said vehicle on said road map on said screen;

guide route-determining/indicating means for determining a guide route connecting a start point of said vehicle and a destination of said vehicle which are set in advance, and indicating said guide route on said road map; and return route-determining means for previously determining a return route for returning said vehicle to said guide route in response to a possible deviation of said vehicle from said guide route before a deviation occurs, said return route-determining means determining said return route according to cost required for said vehicle to return to said guide route via said return route.

9. A vehicle navigation system comprising:

map displaying means for displaying a road map on a screen;

present position-indicating means for indicating a present position of said vehicle on said road map on said screen;

guide route-determining/indicating means for determining a guide route connecting a start point of said vehicle and a destination of said vehicle which are set in advance, and indicating said guide route on said road map;

return route-selecting means for selecting a return route for returning said vehicle to said guide route in response to a deviation of said vehicle from said guide route;

cost-calculating means for calculating cost required for said vehicle to return to said guide route via said return route; and prevention means for preventing said vehicle from entering said return route, depending on said cost calculated by said cost-calculating means;

wherein said prevention means comprises warning means for issuing a warning for prevention of said vehicle from entering said return route.

10. A vehicle navigation system, comprising:

map displaying means for displaying a road map on a screen;

present position-indicating means for indicating a present position of said vehicle on said road map on said screen;

guide route-determining/indicating means for determining a guide route connecting a start point of said vehicle and a destination of said vehicle which are set in advance, and indicating said guide route on said road map;

return route-selecting means or selecting a return route for returning said vehicle to said guide route in response to a deviation of said vehicle from said guide route;

cost-calculating means for calculating cost required for said vehicle to return to aid guide route via said return route; and prevention means for preventing said vehicle from entering said return route, depending on said cost calculated by said cost-calculated means;

wherein said prevention means comprises determining means for determining whether or not said cost exceeds a predetermined value, and warning means for issuing a warning for prevention of said vehicle from entering said return route when said cost exceeds said predetermined value.

11. A vehicle navigation system, comprising:

map displaying means for displaying a road map on a screen;

present position-indicating means for indicating a present position of said vehicle on said road map on said screen;

guide route-determining/indicating means for determining a guide route connecting a start point of said vehicle and a destination of said vehicle which are set in advance, and indicating said guide route on said road map;

return route-selecting means for selecting a return route for returning said vehicle to said guide route in response to a deviation of said vehicle from said guide route;

cost-calculating means for calculating cost required for said vehicle to return to said guide route via said return route; and prevention means for preventing said vehicle from entering said return route, depending on said cost calculated by said cost-calculating means;

wherein said cost includes a time period and a toll which are required for said vehicle to return to said guide route via said return route.

* * * * *